United States Patent
Bush et al.

[11] Patent Number: 5,511,285
[45] Date of Patent: Apr. 30, 1996

[54] LADDER HANDLE ASSEMBLY

[76] Inventors: John B. Bush, 1117 Cleo Chapman, Sunset, S.C. 29685; Randy G. Gilchrist, 632 W. Springwood Dr., Seneca, S.C. 29678

[21] Appl. No.: 229,809

[22] Filed: Apr. 19, 1994

[51] Int. Cl.$^6$ ............................................ E05B 7/00
[52] U.S. Cl. ............................ 16/114 R; 294/15; 294/16; 294/165; 294/170
[58] Field of Search ................ 16/114 R, 110 R, 16/111 R, 112, 124; 248/231.7; 294/15, 16, 165, 170

[56] References Cited

U.S. PATENT DOCUMENTS

| | | | |
|---|---|---|---|
| 1,817,233 | 8/1931 | Bumgardner | 294/15 |
| 2,776,856 | 1/1957 | Ingram | 294/16 |
| 2,873,995 | 2/1959 | Turner | 294/15 |
| 2,967,730 | 1/1961 | Vann | 294/16 |
| 2,997,326 | 8/1961 | Daum | 294/16 |
| 3,718,242 | 2/1973 | Larson | 294/165 |
| 5,161,843 | 11/1992 | Baldwin | 294/16 |

*Primary Examiner*—P. Austin Bradley
*Assistant Examiner*—Chuck Y. Mah
*Attorney, Agent, or Firm*—Ralph Bailey

[57] ABSTRACT

A ladder handle assembly is illustrated wherein an elongated hand gripping element (A) is pivotally carried by a fastener bracket (C) positionable about a side rail of the ladder wherein first and second couplings (D) and (E) respectively are provided to pivotally carry the handle when in use and to permit the handle to be positioned adjacent a ladder side rail when not in use.

11 Claims, 4 Drawing Sheets

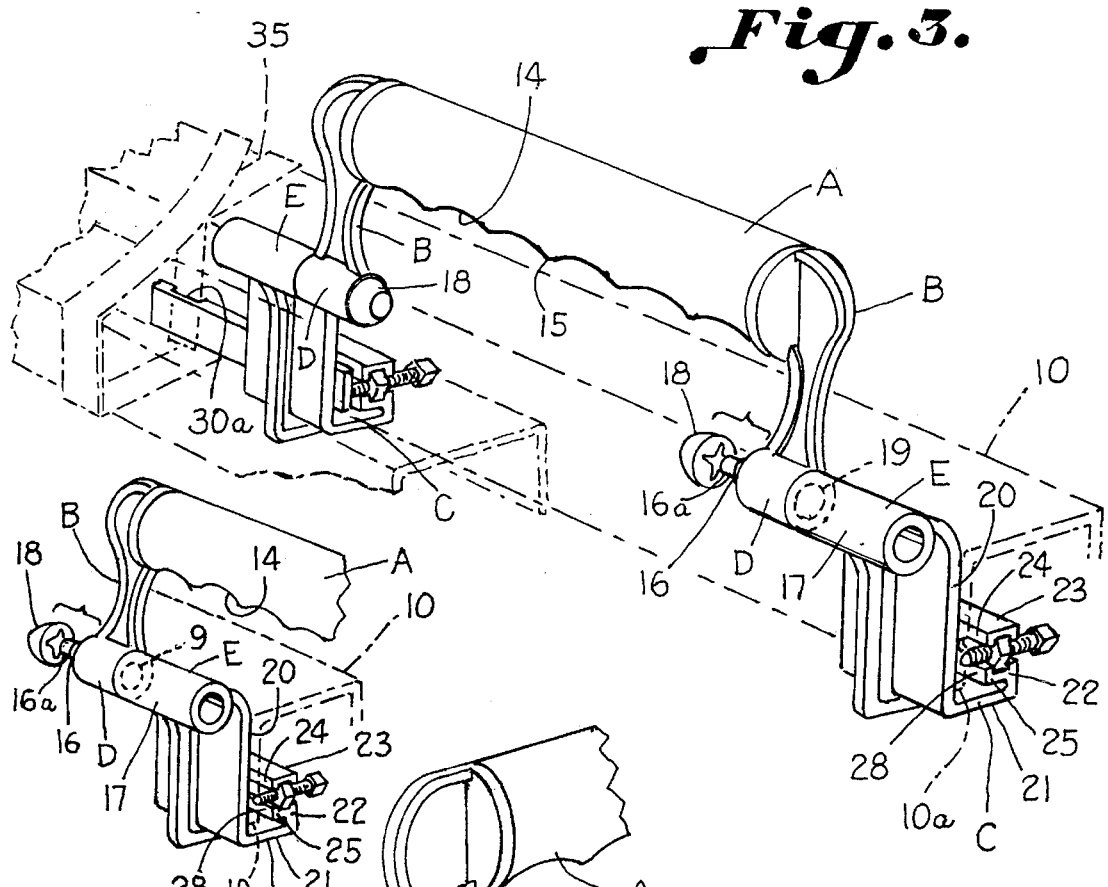
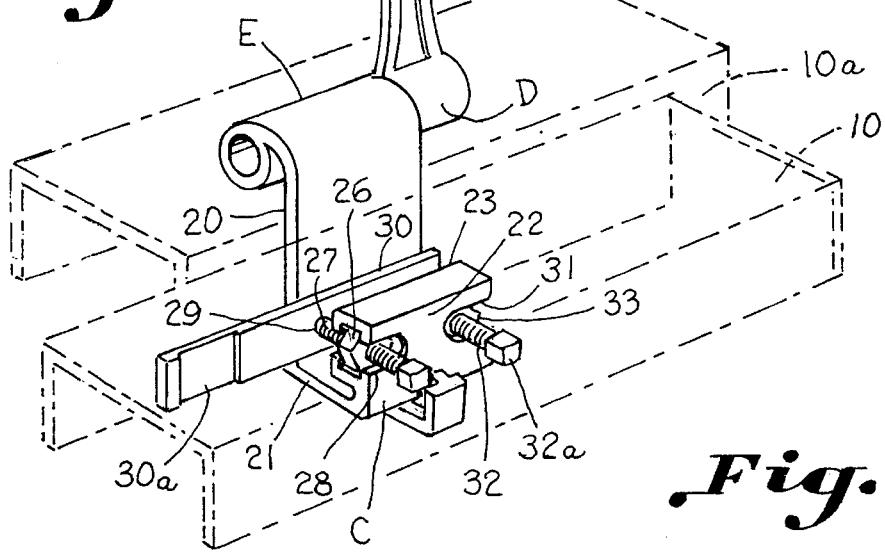

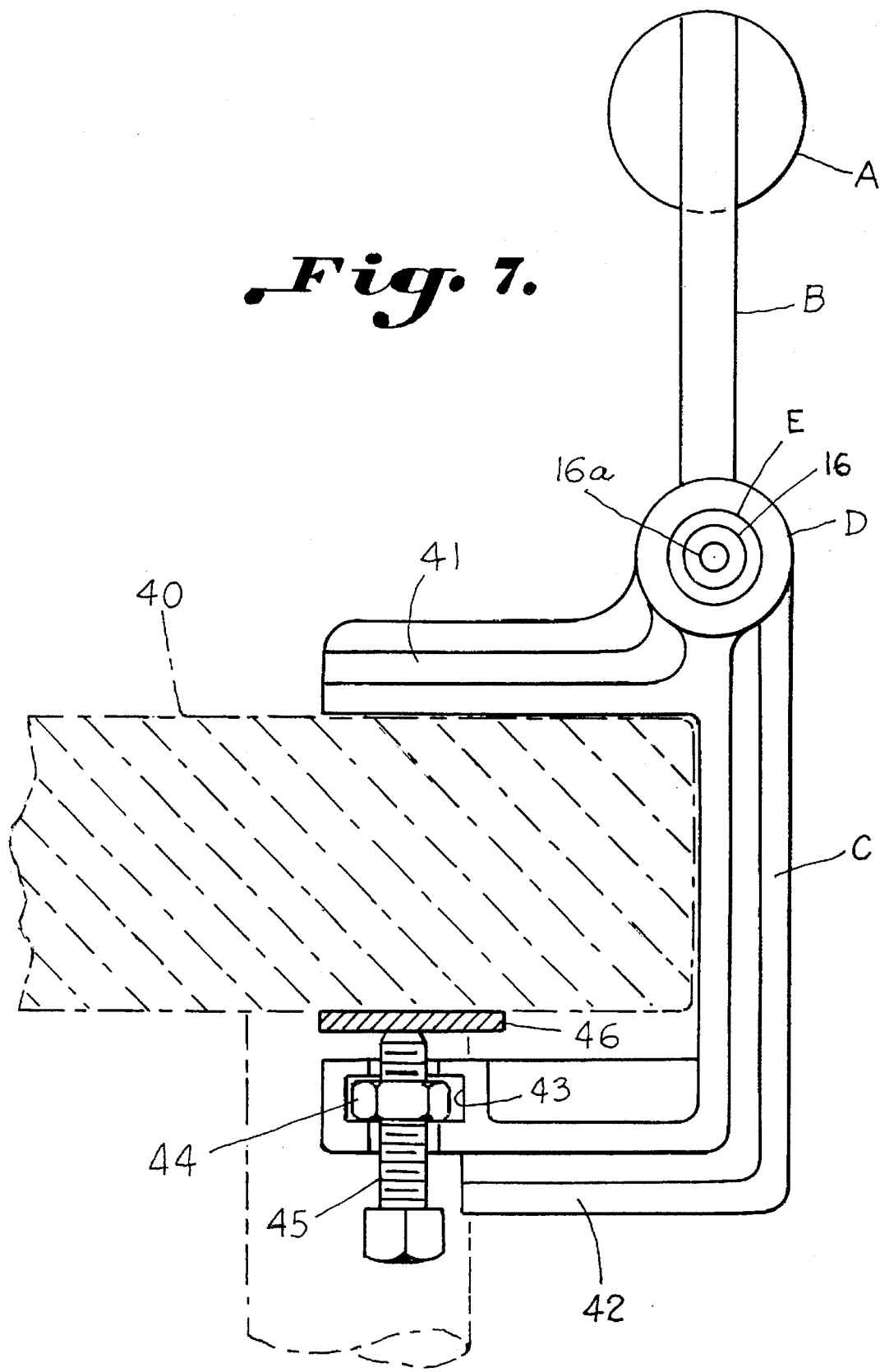

5,511,285

LADDER HANDLE ASSEMBLY

BACKGROUND OF THE INVENTION

This invention relates to a handle assembly for carrying a ladder wherein the handle may be disposed adjacent a side rail of the ladder when not in use but which is raised to carrying position and is pivotally secured to a ladder rail for centering the ladder toward or away from the body when carried in horizontal position by one hand.

It is presently customary to carry ladders both of the spreading and extension types in a variety of positions all of which are awkward and some of which endanger the user. Because of the awkwardness in carrying ladders there is a difficulty in controlling them. Ladders are often caused to swing in undesirable directions causing damage to individuals and property. One of the carrying positions often employed is a two-handed attempt to carry the ladder in horizontal depending position with the steps or rungs in upright position. This causes danger of damaging the back of the user, and the ladder is difficult to control in relation to the body of the user. Other positions include carrying the ladder on the shoulder with the ladder positioned above or with the arm through the steps or rungs. Another position involves placing the ladder in horizontal position with the head projecting between the steps or rungs with the side rails resting on the shoulder.

An attempt has been made to provide a cushion within one of the rails of the ladder and which is centrally disposed for resting of the rails against the shoulder with the arm extended between the rungs so as to facilitate carrying. The following U.S. Patents illustrate the state of the art relating to handles for various purposes: U.S. Pat. Nos. 1,817,233; 2,789,001; 2,997,326; 3,414,910; and 3,793,674.

SUMMARY OF THE INVENTION

Accordingly, it is an important object of the invention to provide a centrally disposed handle assembly for carrying ladders in common use including extension ladders as well as spreading ladders by attachment to one of the rails positioning the ladder carried horizontally with the steps or rungs in upright relation and carried by one hand of the user.

Another important object of the invention is to provide a handle assembly which may be safely carried by one hand of the user while standing in erect position avoiding the various bodily contortions normally utilized in carrying ladders.

Another important object of the invention is to provide a handle assembly for ladders to promote safety of the individual in relation to the user, other persons and property.

Another important object of the invention is to provide a handle assembly wherein a comfortable handle is positionable over a balance point of the ladder to permit safely carrying the ladder below the waist and, because a multiple finger grip arrangement may be provided, the hand of the user may be carried forwardly of or behind the balance point to cause the ladder to tilt upwardly or downwardly when the user is walking over sloped terrain.

Another important object of the invention is the provision of a handle assembly for a ladder which is positionable adjacent a side ladder rail when not in use but which is pivotal and which may be raised for convenient balance of the ladder for carrying by one hand of the user while standing in upright position.

Another important object of the invention is the provision of a versatile handle assembly for use in connection with varieties of ladders in common use whether the ladder be of metallic or fiberglass frame construction or ladders having wooden rails.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is an enlarged perspective view of a fastener bracket and related parts for securing the handle assembly to a side rail of a fiberglass or metallic ladder with the parts in assembled relation and constructed in accordance with the present invention;

FIG. 3 is a perspective view further illustrating the handle assembly of FIG. 1 wherein an elongated hand gripping element is provided with a series of spaced finger grips in excess of four inside the hand gripping element to accommodate positioning of the hand in several locations and illustrating means for securing a spreading ladder together by connecting the rails through the use of a Velcro strap shown in broken lines;

FIG. 3A is a perspective view illustrating the positioning of the right hand outside bracket of FIG. 3 as the inside left hand bracket so as to position the downwardly extending legs inside of the handle for varying the space between the brackets.

FIG. 7 is an enlarged end view illustrating a modified form of the invention wherein a modified fastener bracket is provided for fastening the handle assembly about a wooden rail of a ladder.

DESCRIPTION OF A PREFERRED EMBODIMENT

The drawings illustrate a handle assembly for carrying a ladder having parallel side rails including an elongated hand gripping element A. A depending leg B is carried on one end thereof at each end of the elongated hand gripping element. A fastener bracket C secures each depending leg to a side rail of the ladder. A first coupling D is carried at the other end of the depending legs, and a second coupling E is carried by the fastener bracket. Thus, the first coupling and the second coupling form a pivotal connection securing each depending leg to a respective fastener bracket. The ladder may be carried by one hand of the user on the elongated hand gripping element for balanced inclination toward or away from the user, and the elongated hand gripping element placed adjacent the rail when not in use carrying the ladder.

Figure 1:
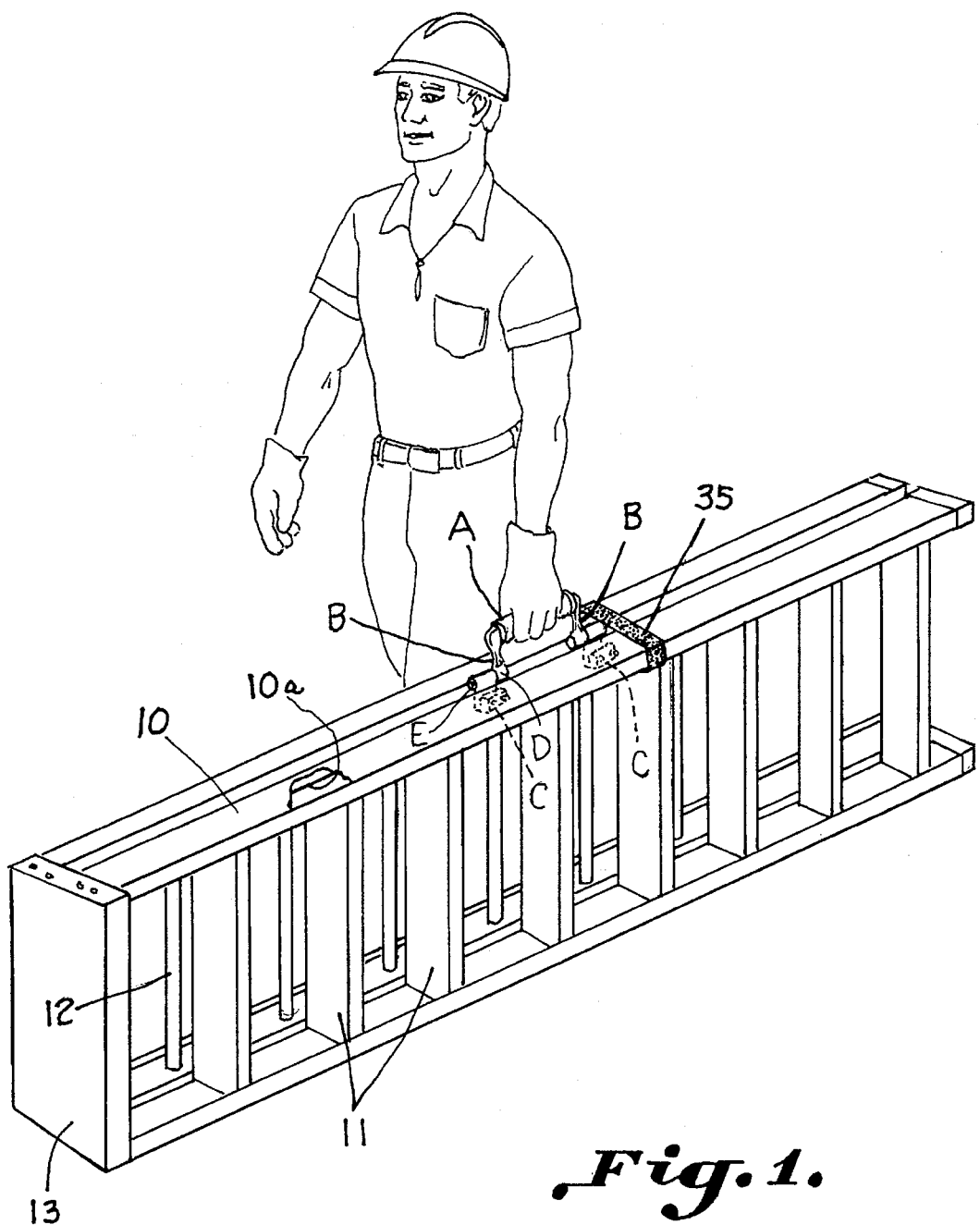
FIG. 1 is a perspective view illustrating a ladder in horizontal position with the steps upright in balanced carrying position by a user with a handle assembly constructed in accordance with the present invention attached to one of the side rails of the ladder.

Referring more particularly to FIG. 1, the assembly is illustrated as being attached to a side rail 10 of a spreading ladder which includes steps 11 in upright position and rungs 12 on a side opposite the stepped side of the ladder. The ladder has an upper frame member 13 bridging the pivotally carried adjacent sides for spreading as limited by the usual linkage (not shown).

Referring more particularly to FIGS. 2 and 3, the handle A is illustrated as having a number of indentations 14 between enlarged portions 15 constituting a series of finger grips in excess of four. The handle is preferably molded of nonconductive high impact plastic which may be easily attached to both step and extension ladders, by having more than four finger grips and preferably six as illustrated, it is possible to select a position for the hand to facilitate gripping and which will be adjustable so as to cause the ladder to incline in FIG. 1 upwardly or downwardly at a leading edge depending upon whether the surface upon which the user is walking goes up or down to facilitate carrying. If six finger grips are utilized as illustrated, the fingers may be positioned centrally to carry the ladder in a level position as on level ground and moved forwardly to tilt the forward end of the ladder upwardly or moved rearwardly to lower the forward end of the ladder.

The depending legs B are integral with the elongated hand gripping element or handle and carry a coupling D on a free lower end for receiving a reduced portion 16 of the enlarged circular portion 17 of the second coupling E. A cap 18 (FIG. 3) is illustrated as securing the reduced portion 16 in respect to the circular first coupling D by securement upon a reduced receiving portion 16a. The first coupling D has a bore 19 therein for receiving the reduced member 16.

The fastener brackets C each have a vertical leg 20 carried integrally on and depending from the second coupling E. A lower outwardly extending leg 21 is carried at a right angle to the vertical leg 20 and adjacent its free end carries an upright leg 22. The upright leg carries an inwardly projecting portion 23 at its free end which in turn has a downwardly extending member 24 carried thereon so as to turn at a right angle at 25 to be integrally joined with the upright leg 22 thus forming an open slot for reception of a nut 26 and for confining the nut against turning. A threaded member 27 extends through an opening 28 and is received within a hole 29 within an elongated shim or insert 30 overlying the downwardly extending leg 10a. On an opposite side of the upright leg 22 a second horizontal opening 31 is formed for receiving a threaded member 32. A fixed nut 33 carried by the threaded member 32 is retained within the slot formed between the members 23 and 25. The threaded member 32 has a head 32a which may be turned for causing the threaded member to bear against the shim 30 confining a downwardly extending leg 10a of the rail 10 within the fastener bracket C.

Figure 4:
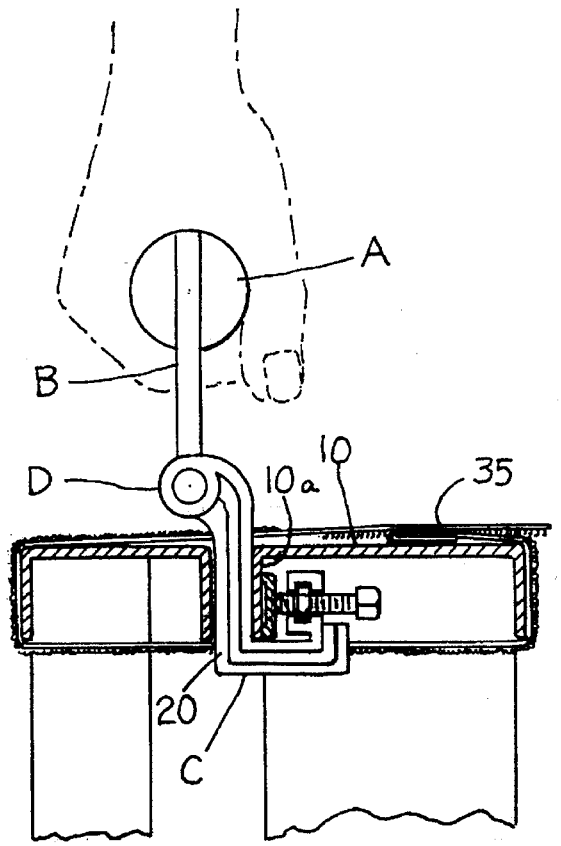
FIG. 4 is an end view illustrating the handle assembly constructed in accordance with the present invention with the Velcro strap and with the handle upright in carrying position.

It will be observed in FIGS. 3 and 4 that a Velcro strap 35 may be looped on one end about a recess 30a in the shim 30 and passed around both adjacent side rails of the ladder to hold the frames of a spreading ladder together for ease in carrying.

Thus, the first and second couplings are arcuate and receivable in horizontally aligned relation, the brackets being interchangeable between inside and outside relationships on opposite couplings to vary the space between brackets to accommodate different ladder configurations as illustrated in FIGS. 3 and 3A.

Figure 5:
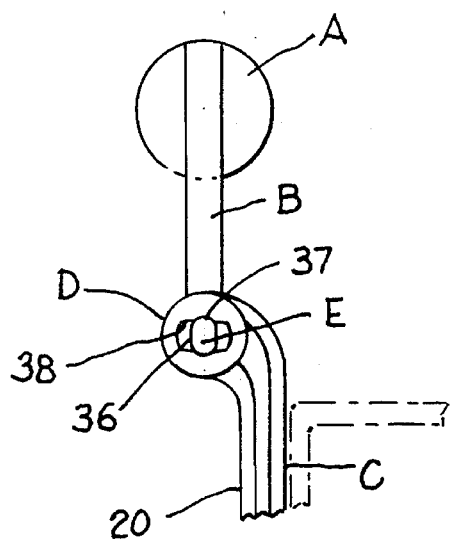
FIG. 5 is an enlarged end view illustrating the first and second coupling for pivoting the handle so as to afford camming means urging the handle toward the rail thus biasing same toward an out of the way position when not in use.
Figure 6:
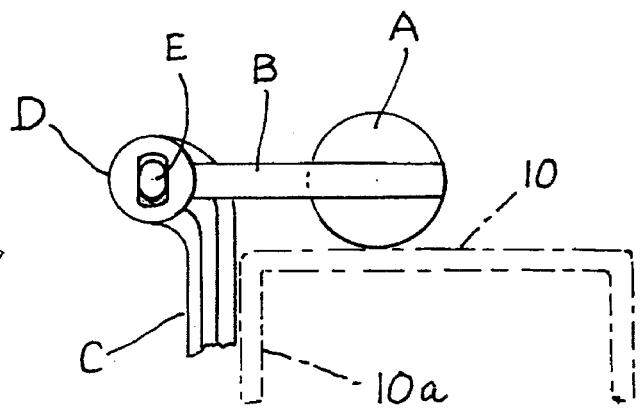
FIG. 6 is an end view illustrating the handle in retired position adjacent a rail of the ladder.

Referring more particularly to FIGS. 5 and 6, an alternate form of the invention is illustrated wherein the second coupling E is oblong having elongated sides 36 and arcuate end members 37 for reception within an oblong bore 38 within the first coupling D. The oblong bore 38 is at right angles to the sides 36. FIG. 6 illustrates the handle in retired position into which it is held by the camming action of the oblong member within the oblong opening.

FIG. 7 illustrates another modified form of the invention wherein a wooden side rail 40 is carried between the legs of a fastener bracket C. The fastener bracket has the usual second coupling E. An upper leg is illustrated at 41. A lower leg 42 defines a horizontal slot 43 for containing and fixing a nut 44 which carries a threaded member 45 for bearing against a shim or insert 46. A second nut (not shown) may be spaced within the recess 43 for positioning a second threaded member for reception within the shim 46 to limit movement thereof with respect to the wooden rail.

It is thus seen that a universal ladder handle assembly has been provided which readily accommodates the hand of a user for positioning the ladder so as to be adapted to the terrain and so as to be pushed to one side when not in use. It will also be observed that installation of the assembly requires no drilling.

While a preferred embodiment of the invention has been described using specific terms, such description is for illustrative purposes only, and it is to be understood that changes and variations may be made without departing from the spirit or scope of the following claims.

What is claimed is:

1. A handle assembly for carrying a ladder having parallel side rails comprising:

an elongated hand gripping element having two ends;

two depending legs having one end on each leg attached adjacent to said ends of said elongated hand gripping element respectively; the other end of each depending leg having a first coupling and having a second coupling carried by a fastener bracket;

said first coupling and second coupling forming a pivotal connection securing each depending leg to said fastener bracket; said fastener bracket being attachable to a side rail of said ladder;

whereby said ladder can be carried by one hand of a user on the elongated gripping element secured to a side rail of the ladder.

2. The handle assembly set forth in claim 1 wherein said bracket having a vertical leg extending from said second coupling and a lower leg extending outwardly from said vertical leg; a threaded fastener extending through said bracket for securing said bracket and the hand gripping element to said side rail.

3. The handle assembly set forth in claim 2 wherein each said bracket has a terminal leg extending upwardly from said lower leg for securement of said bracket.

4. The handle assembly set forth in claim 2 wherein and each said bracket has a terminal leg extending horizontally opposite said lower leg for securement of said brackets.

5. The structure set forth in claim 1 wherein said hand gripping element has a plurality of finger indentations in excess of four so as to accommodate the hand of the user in selected positions to accommodate the ladder in various attitudes during carrying.

6. The handle assembly set forth in claim 1 wherein a Velcro strip is attached to said assembly for securing opposite side rails together.

7. The handle assembly set forth in claim 1 wherein said first and second couplings have engaging surfaces for camming said gripping element to a position adjacent said rail.

8. The handle assembly set forth in claim 1 wherein said first and second couplings are arcuate and receivable in horizontally aligned relation, said couplings being interchangeable between a left inside and a right outside relationship, and between a right inside and a left outside relationship on opposite couplings to vary the space between brackets to accommodate different ladder configurations.

9. A handle assembly for carrying a ladder having parallel side rails comprising:

an elongated hand gripping element having two ends;

two depending legs having one end on each leg attached adjacent to said ends of said elongated hand gripping element respectively;

each depending leg having a coupling means forming a pivotal connection securing each depending leg to a fastener bracket; said fastener bracket being attachable to a side rail of said ladder;

whereby said ladder can be carried by one hand of a user on the elongated gripping element secured to a side rail of the ladder.

10. The handle assembly set forth in claim 9 wherein said hand gripping element is attachable to the ladder by a clamping action avoiding drilling holes in the ladder for attachment purposes.

11. The handle assembly set forth in claim 10 including flat inserts being placeable between the brackets and said side rail.

* * * * *